D. B. Bartholomew,
Resawing Machine.
N° 18,948.          Patented Dec. 29, 1857.
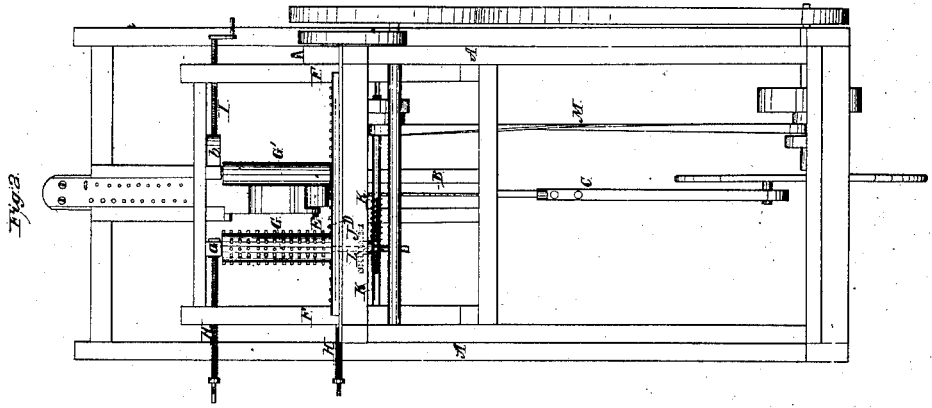
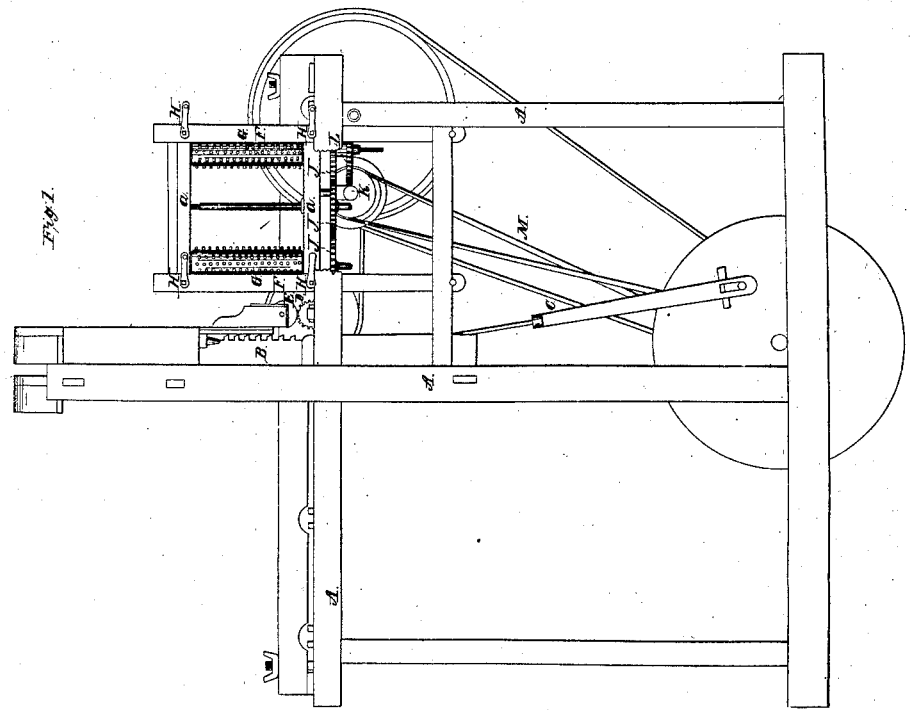

UNITED STATES PATENT OFFICE.

D. B. BARTHOLOMEW, OF LANCASTER, PENNSYLVANIA.

GEARING FOR FEED-ROLLERS IN RESAWING-MACHINES.

Specification of Letters Patent No. 18,948, dated December 29, 1857.

*To all whom it may concern:*

Be it known that I, D. B. BARTHOLOMEW, of Lancaster, in the county of Lancaster and State of Pennsylvania, have invented a new and useful Improvement in Sawing-Machines; and I do hereby declare that the following is a full, clear, and exact description of the same, reference being had to the accompanying drawings, forming part of this specification, in which—

Figure 1, is a side view of a saw mill with my improvements applied to it. Fig. 2, is a front end view of the same.

Similar letters of reference in each of the several figures indicate corresponding parts.

My invention relates simply to the adjustment of the feed rollers, and the nature of my invention consists in the arrangement of a screw shaft transversely and at right angles to the vertical adjustable feed rollers, and combining the same with the gearing which actuates said rollers by means of a screw pinion which is on the lower end of one of the feed rollers. The said screw shaft being driven by a belt from the crank or pitman shaft, and serving to effect a positive and regular feed of the log, and also allowing of one set of the feed rollers, while remaining in gear, being adjusted, by set screws, so as to feed the log up against another set of yielding gage feed rollers, directly opposite, every time a strip is cut from the log.

I am aware that adjustable and gage feed rollers with a continuous revolving motion are common, an example being seen in the patented saw mill of Pearson Crosby 1841. In order, however to employ such rollers and operate the same from the pitman shaft, a very complicated and unsteady arrangement of mechanism has heretofore been adopted. Whereas my arrangement is exceedingly simple and steady, and with it the log can be fed up square against the yielding rollers with great convenience and despatch and without ungearing the mechanism or any chance of its becoming ungeared, no matter to what extent the log be moved, and when the log is fed up it will be held firmly while being acted upon by the saw.

To enable others skilled in the art to make and use my invention, I will proceed to describe its construction and operation.

A, represents the frame of saw mill. B, the saw, guided at top and bottom; C, the pitman; D, transverse feed roller for supporting and introducing the front end of the log to the saw; E, adjustable gage guide roller for holding it down.

F, represents a frame for supporting and containing my improved feed movement. This frame is stationary.

G, G', represent two lines of feed rollers, they are arranged in laterally sliding pieces a, a, of the stationary frame F. Those of the line G, are furnished with sharp spurs so as to take a hold on the log, those in the line G', are smooth and have no spurs in order that the board or strip shall not be marred.

H, H, H, H, are set screws for adjusting the cross pieces with the rollers G; I, set screws for adjusting the rollers G'. These screws bear, and act against springs b, which give the rollers G', a chance to yield in case of irregularity in the stuff. The rollers G, are adjusted every time a strip is cut off. The rollers G', whenever it is desired to decrease or increase the thickness of the strip.

J, J, J, represent cog gears which combine the rollers G, G', so that they operate unitedly. These gears are on the lower part of the shafts of the rollers G, G'; K, represents the screw shaft, it is placed transversely in the frame below the feed rollers and gears J, J, J; L, is the screw pinion which gears into the worm or screw-thread of said shaft. This pinion is on the lowest extremity of the shaft of the rear feed roller G, as shown. M, is a band leading from the screw shaft K, to the pitman or crank shaft of the saw mill. By having the screw pinion thus gear with the thread or worm of a transverse screw shaft it will be seen that any adjustment, laterally, desired can be effected without any of the parts becoming ungeared, as the screw or worm is made of sufficient length to allow for the greatest or smallest adjustments; it will also be seen that the adjustment can be effected, while all the parts occupy their proper position relatively to one another, and when adjusted the parts are firm and steady, all the parts setting square and perpendicular.

What I claim as my invention and desire to secure by Letters Patent, is—

The arrangement of a screw shaft K, transversely, and at right angles to the vertical adjustable feed rollers G, G', when combined with the gearing J, J, J, by means of a screw pinion L, substantially as and for the purposes set forth.

D. B. BARTHOLOMEW.

Witnesses:
W. CARPENTER,
HIRAM YOUNG.